United States Patent
Laursen et al.

(10) Patent No.: US 6,909,984 B2
(45) Date of Patent: Jun. 21, 2005

(54) WAFER ALIGNMENT SYSTEM

(75) Inventors: James W. Laursen, Meridian, ID (US); Craig A. Hickman, Meridan, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 10/771,291

(22) Filed: Feb. 5, 2004

(65) Prior Publication Data

US 2004/0158423 A1 Aug. 12, 2004

Related U.S. Application Data

(63) Continuation of application No. 09/652,218, filed on Aug. 30, 2000, now Pat. No. 6,708,131.

(51) Int. Cl.⁷ .............................................. G05B 11/01
(52) U.S. Cl. ......................... 702/109; 702/95; 702/150; 700/121
(58) Field of Search ......................... 702/109, 95, 150, 702/33, 40, 85, 94, 105, 113, 117, 118, 108, 151–153, 188; 250/548, 559.06, 559.1, 559.29, 559.3, 559.44, 559.48, 208.3; 356/399–402, 490, 485, 139.04, 607, 608, 614; 430/30, 22, 394; 700/119–121, 117, 118, 192–194, 254, 262; 438/5, 17, 14, 16; 318/640; 355/53, 67; 382/151

(56) References Cited

U.S. PATENT DOCUMENTS

| | | | |
|---|---|---|---|
| 4,929,083 A | * 5/1990 | Brunner | 356/400 |
| 5,464,715 A | 11/1995 | Nishi et al. | 430/22 |
| 5,617,340 A | 4/1997 | Cresswell et al. | 702/85 |
| 5,740,062 A | 4/1998 | Berken et al. | 700/218 |
| 6,133,986 A | 10/2000 | Johnson | 355/67 |
| 6,278,957 B1 | 8/2001 | Yasuda et al. | 702/150 |
| 6,285,033 B1 | 9/2001 | Matsumoto | 250/548 |
| 6,549,269 B1 | * 4/2003 | Nishi et al. | 355/53 |
| 6,671,048 B1 | * 12/2003 | Leroux | 356/401 |

* cited by examiner

Primary Examiner—Hal Wachsman
(74) Attorney, Agent, or Firm—Dickstein Shapiro Morin & Oshinsky LLP

(57) ABSTRACT

A system is provided for producing an integrated circuit using a stepper and a scanner in successive stages. Calibration data developed for the transfer of a wafer from the stepper to the scanner while maintaining the same orientation is transformed, and the transformed data is used to align a rotated wafer on the scanner.

22 Claims, 6 Drawing Sheets

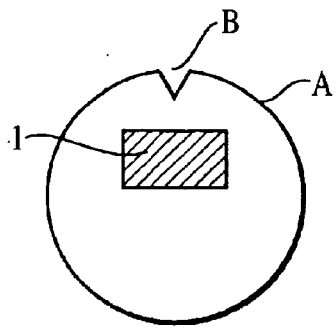
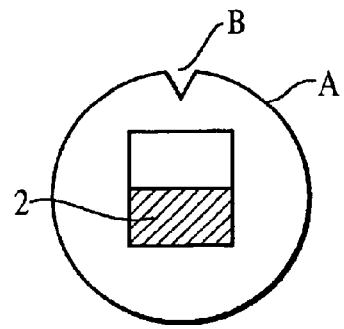
FIG. 1
PRIOR ART
FIG. 2
PRIOR ART
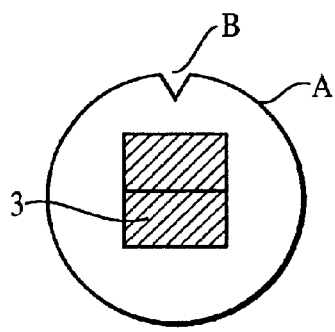
FIG. 3
PRIOR ART
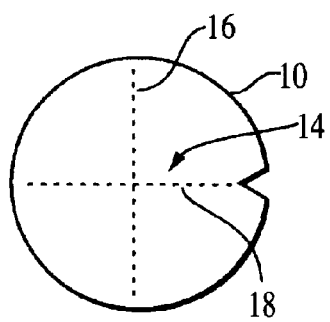
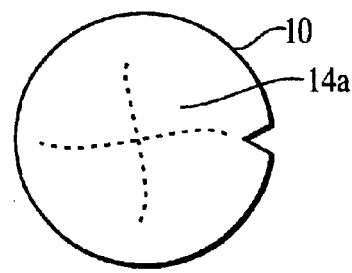
FIG. 5
FIG. 6

WAFER ALIGNMENT SYSTEM

This application is a continuation of U.S. patent application Ser. No. 09/652,218, filed Aug. 30, 2000, now U.S. Pat. No. 6,708,131 issued Mar. 16, 2004.

FIELD OF THE INVENTION

The present invention relates to photolithography processes for manufacturing integrated circuits. More particularly, the invention relates to a method of aligning wafers for successive stepping and scanning stages of a photolithographic process.

BACKGROUND OF THE INVENTION

Photolithography is used to manufacture integrated circuits by exposing a suitably prepared wafer to light passing through a mask. The entire wafer can be exposed at once. Often, however, separate sub-areas of a wafer are successively exposed in a stepping process, or a band of light is directed synchronously across a mask and a region of a wafer in a scanning process. Alignment is critically important when multiple photolithographic processes are used to manufacture an integrated circuit.

Alignment refers to, among other things, the process of registering a mask to a wafer. Many methods of alignment are known. In one method, a wafer is carried on a fixture called a wafer stage. The wafer is indexed to the wafer stage by a notch in its periphery and the wafer stage is supported by a movable carriage. The carriage positions the wafer stage as part of stepping and/or scanning processes.

Mirrors are typically affixed to the wafer stage and as the wafer stage is moved interferometers focused on the mirrors precisely locate the wafer stage to align the wafer stage with the appropriate mask and light source. Typically the wafer stage is rectilinear. Therefore, only two sets of two mirrors, one set parallel to the x-axis and one set parallel to the y-axis, are required to appropriately locate the wafer stage in the x-y plane.

An example of a photolithographic process including stepping and scanning steps is illustrated in FIGS. 1–3. In FIG. 1, a light source and mask are aligned to expose a first region 1 of a wafer A. In FIG. 2, the light source and mask are aligned to expose a second region 2 of wafer A. This constitutes a two-step stepping process. A scanning process then commences. In the first step of the scanning process, a mask is aligned with a third region 3 of wafer A, and a light source traverses the mask exposing region 3 in FIG. 3.

Alignment of the masks used in the scanning process with the existing stepped regions is critical. This alignment becomes more difficult when the scanning process is completed on a different machine from the stepping process. Moreover, the surfaces of the mirrors used to align the wafer stage are not completely flat, and mirror imperfections will affect alignment when critical dimensions are small. The mirrors, therefore, must be calibrated.

One method to accomplish this inter-machine alignment uses a calibration wafer. According to this method, a calibration wafer is placed in a first machine, and a calibration pattern is printed by the first machine on the calibration wafer. The actual position of the points of the calibration pattern are carefully measured. The calibration pattern measurement data, along with the position of the calibration wafer according to the alignment mirrors of the first machine, is stored in a memory.

The calibration wafer is placed in the second machine in the same orientation as the first machine. A nominally identical calibration pattern is printed by the second machine on the calibration wafer. The actual position of the points of the second calibration pattern are carefully measured. The second calibration pattern measurement data, along with the position of the calibration wafer according to the alignment mirrors of the second machine, is stored in a memory.

The first calibration pattern measurement data, first alignment mirror position, second calibration pattern measurement data and second alignment mirror position are processed to account for, among other things, the disparities of the alignment mirrors. When a production wafer is processed in a first machine, then transferred to a second machine in the same orientation, the processed data from the calibration process is used to adjust the position of the production wafer in the second machine to bring it into true alignment with the regions exposed on the production wafer by the first machine.

When scanning is done in the same linear direction as stepping, once the wafer is placed in the apparatus, its only movement will be along the x and y axes and no rotation to change wafer orientation is necessary. For instance, in FIG. 10, a shallow, rectangular first region 1a is exposed on a wafer C, followed by a similar second region 2a as shown in FIG. 11. These stepping processes could be followed by one scanning process similar to those shown in FIG. 3. Sometimes, however, it is advantageous to carry out stepping and scanning processes in different directions with respect to a wafer. For example, as shown in FIG. 12, under certain geometries a single pass of the scanner 200 in a direction 90° to the path of the stepper 100 can expose a single region 3a covering both regions 1a and 2a.

Many integrated circuit manufacturing centers are not equipped to execute stepping and scanning in different directions. In these manufacturing centers, the wafer must be rotated 90° to accommodate stepping passes orthogonal to scanning passes. This is illustrated in FIG. 13, where the wafer C has been rotated 90° to accommodate a region 4a scanned in the same linear direction as the stepping processes. When multi-directional stepping and scanning requires a rotation of a wafer, the alignment process described above cannot be used. What is required then, is a method of aligning and manufacturing a rotated production wafer.

SUMMARY OF THE INVENTION

The invention concerns a method for aligning wafers in machines used to manufacture integrated circuits.

In the invention, a first pattern is formed in a calibration wafer in a first orientation in a first machine and a second pattern is formed in the calibration wafer in said first orientation in a second machine. Next, the difference between the first pattern and the second pattern is measured and stored in a memory. The difference is transformed to account for a change in orientation, typically a 90° rotation.

Next, regions in a production wafer in the first orientation are processed in the first machine and the location of the production wafer in the first machine is determined.

The production wafer is then transferred to the second machine in a second orientation, typically at a 90° rotation.

The location of the production wafer in the second machine is determined next, and then adjusted using the transformed difference. Finally, the production wafer is aligned in the second machine using the adjusted location data; and the regions in the production wafer are processed in the second machine.

In one example of the invention, the first machine is a stepper and the second machine is a scanner, each with their own processor and memory. The scanner processor retrieves the coordinates of the cruciform patterns, transforms them, and adjusts the alignment of the production wafer in the scanner using the transformed coordinates.

A 90° change in the orientation of the production wafer is useful when two successive regions of the production wafer are exposed in the stepper in a first direction, the scanning breadth of the scanner exceeds the length of the two successive stepped regions in the first direction, and a single scanning pass in a second direction exposes both successive stepped regions in the production wafer in a single scanning pass.

According to one aspect of the invention, positional differences may be transformed by switching the x-coordinates of the cruciform pattern in the scanner with the y-coordinates of the cruciform pattern in the scanner.

The above and other advantages and features of the invention will be more readily understood from the following detailed description of the invention which is provided in connection with the accompanying drawings.

BRIEF DESCRIPTION OF THE DRAWINGS

FIG. 1 is a plan view of a wafer with a first stepped area exposed according to a conventional process.

FIG. 2 is a plan view of the wafer of FIG. 1 with a second stepped area exposed according to a conventional process.

FIG. 3 is a plan view of the wafer of FIGS. 1 and 2 with a first scanned area exposed according to a conventional process.

FIG. 5 is a plan view of a calibration wafer with a nominal cruciform pattern.

FIG. 6 is a plan view of a calibration wafer with an actual cruciform pattern formed in a stepper.

DETAILED DESCRIPTION OF PREFERRED EMBODIMENTS

Figure 4A:
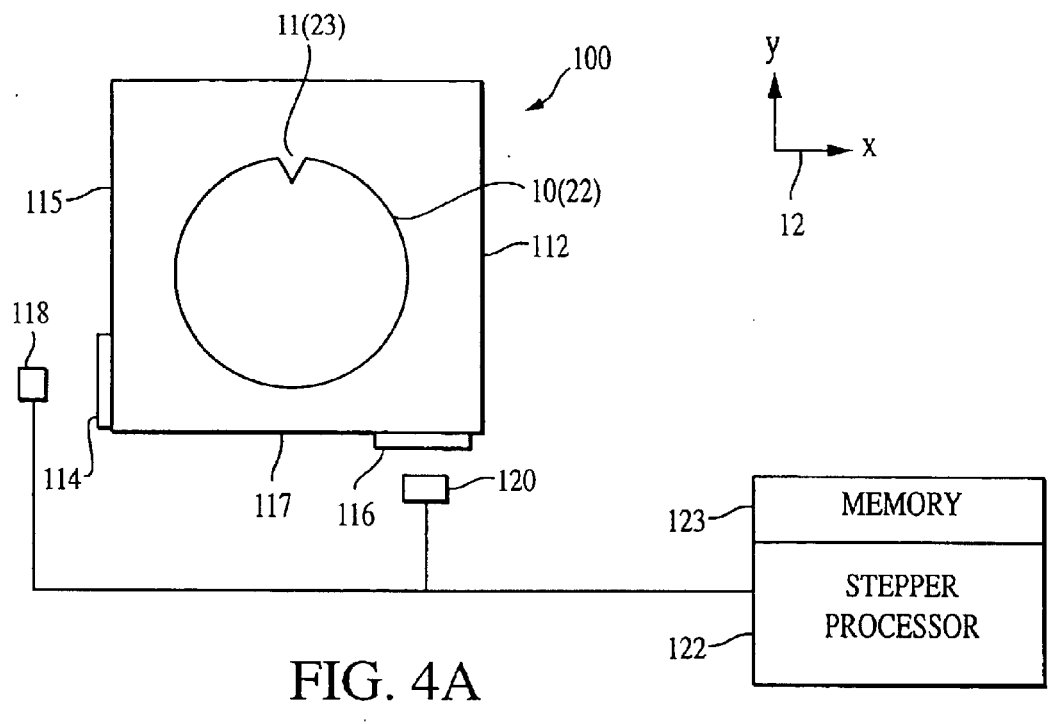
FIGS. 4A and 4B illustrate a partial schematic drawing of a stepper and a scanner.
Figure 4B:
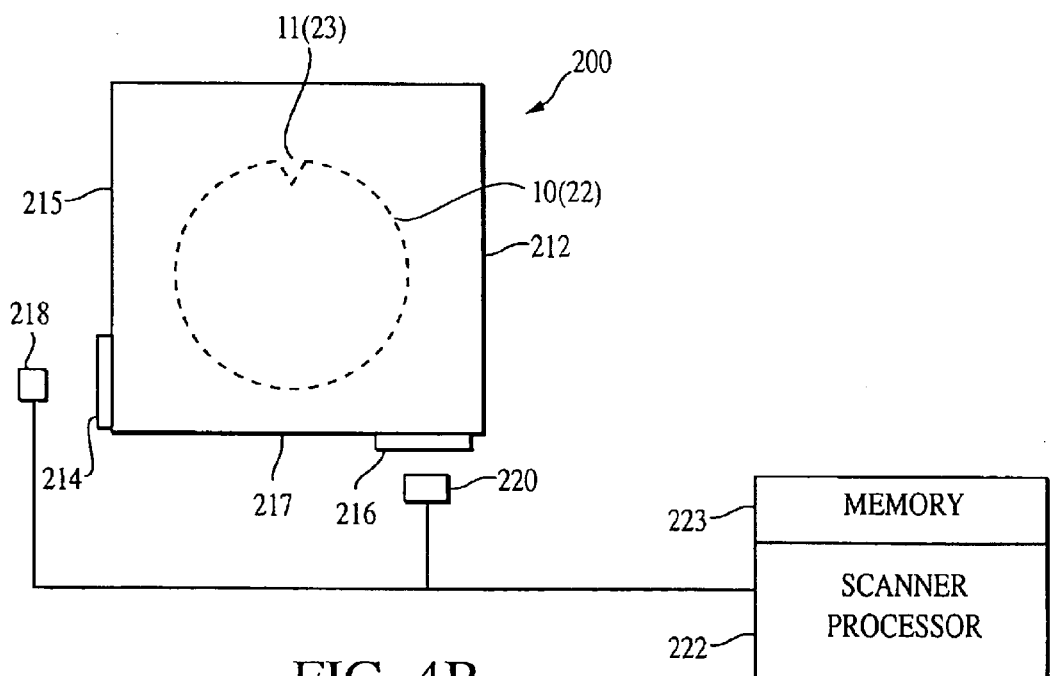

As shown in FIGS. 4A and 4B a calibration wafer 10 is placed in a wafer stage 112 of a first, or reference machine, in this case, the stepper 100. The wafer stage 112 of the stepper 100 is supported by a carriage (not shown). The carriage is capable of moving the wafer stage in the x and y directions, as indicated by the arrows 12. The wafer stage 112 has an x-location mirror 114 attached to a side 115 parallel to the y-axis and a y-location mirror 116 attached to a side 117 parallel to the x-axis. An x-location interferometer 118 focused on the x-location mirror 114 is attached to the frame (not shown) of the stepper 100, and a y-location interferometer 120 also attached to the frame, is focused on the y-location mirror 116. The movement and location of the wafer stage is very precisely controlled.

As shown in FIG. 5, a cruciform pattern 14 is printed on the calibration wafer 10 consisting of points arranged in a vertical bar 16, a nominally straight line parallel to the y-axis, and a horizontal bar 18, a nominally straight line parallel to the x-axis. This pattern is produced by moving the wafer stage 112, under a light source (not shown) focused at a non-moving point on the surface of the calibration wafer 10. The wafer stage 112 is then incrementally traversed through the range of the carriage in the y-direction while holding a single position of the carriage in the x-direction as indicated by the x-location interferometer 118 reading of the x-location mirror 114. Next, the wafer stage 112 is incrementally traversed throughout the range of the carriage in the x-direction while holding a single position of the carriage in the y-direction as indicated by the y-location interferometer 120 reading of the y-location mirror 116. Because the mirrors are not perfectly flat the actual cruciform pattern 14a produced will be slightly curved as shown in FIG. 6.

The actual positions of the points along the nominally cruciform pattern 14a formed on the calibration wafer 10 are precisely determined using the stepper metrology. The x and y coordinates of these points constitute an array, $x_A$, $y_A = \{x_{A1}, y_{A1}, x_A, y_{A2}, x_{A3}, y_{A3} \ldots x_{An}, y_{An}\}$. Returning to FIGS. 4A and 4B, this array of points is transmitted by the processor 122 of the stepper 100 to its memory 123.

Figure 7:
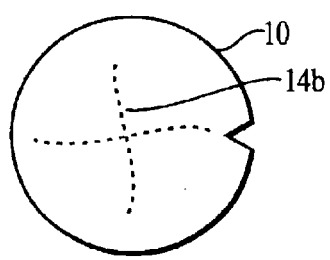
FIG. 7 is a plan view of a calibration wafer with a second actual cruciform pattern formed in a scanner.

The calibration wafer 10 is removed from the wafer stage 112 of the stepper 100 and is placed in the wafer stage 212 of the scanner 200. During this transfer step, the calibration wafer 10 is maintained in the same orientation in the x-y plane with the notch 11 of the wafer 10 facing right. A second nominally cruciform pattern 14b is printed on the calibration wafer 10 in the same manner as the pattern 14a was formed on the stepper 100. The second actual cruciform pattern 14b is also curved and is shown in FIG. 7. The first actual cruciform pattern 14a is omitted from FIG. 7 for clarity.

The actual positions of the points along the second nominally cruciform pattern 14b formed on the calibration wafer 10 are then precisely determined using the scanner metrology. The x and y coordinates of these points constitute an array, $x_B$, $y_B = \{x_{B1}, y_{B1}, x_{B2}, y_{B2}, x_{B3}, y_{B3} \ldots x_{Bn}, y_{Bn}\}$. This array is transmitted by the processor 222 of the scanner 200 to its memory 223.

The coordinates of the array $x_A$, $y_A$ stored in the stepper memory 123 are transmitted to the scanner memory 223 by any of a number of means known in the art. A calibration array is then calculated by the scanner processor 222 using the difference between the actual cruciform pattern 14a produced by the stepper 100 and the actual cruciform 14b pattern produced by the scanner 200. This difference is the aggregate differences in the actual positions of corresponding locations on the x-axis for each point on the vertical bar 16 of the cruciform pattern 14 and the actual positions of corresponding locations on the y-axis for each point on the horizontal bar 18 of the cruciform pattern 14.

Figure 8:
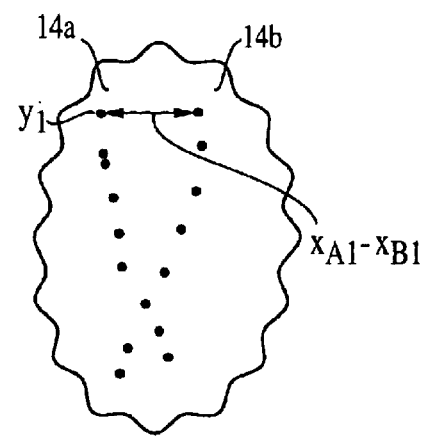
FIG. 8 is a plan view of a portion of the calibration wafer of FIG. 6 and FIG. 7.

To illustrate this calculation, FIG. 8 is a top view of an enlarged part of the calibration wafer showing the part of the vertical bars 16a, 16b of the superimposed actual cruciform pattern 14a of the stepper 100 and the actual cruciform pattern 14b of the scanner 200. For each incremental position on the vertical bar 16, the horizontal distance between the corresponding points on the cruciform pattern is calculated. For example, for position $y_1$, shown in FIG. 8, the horizontal distance $x_{A1}-x_{B1}$ between corresponding points of the actual cruciform pattern 14a of the stepper 100 and the actual cruciform pattern 14b of the scanner 200 is calculated. This calculation is repeated for each incremental position on the vertical bar 16, and is assembled into the vertical component of the calibration array $(x_A-x_B)$, y=$(x_{A1}-x_{B2})$, $y_1$, $(x_{A2}-x_{B2})$, $y_2$, . . . $(x_{An}-x_{Bn})$, $y_n$. This vertical calibration array accounts for the difference in profile between the x-location mirror 114 of the stepper 100 and the x-location mirror 214 of the scanner 200.

Similarly, for each incremental position on the horizontal bar, the vertical distances between the corresponding points in the cruciform patterns are calculated, and are assembled into the horizontal component of the calibration array x, $(y_A-y_B)$={$x_1$, $(y_{A1}-y_{B1})$, $x_2$ $(y_{A2}-y_{B2})$, . . . $x_n$ $(y_{AN}-y_{BA})$}. The horizontal calibration array component accounts for the difference in profile between the y-location mirror 116 of the stepper 100 and the y-location mirror 216 of the scanner 200. The complete calibration array $(x_A-x_B)$, y, x $(y_A-y_B)$ includes both the vertical and horizontal components.

During the manufacture of an integrated circuit according to the stepping and scanning pattern of FIGS. 1–3, the calibration array is used to determine and control the position of a production wafer 22 in the integrated circuit manufacturing center of FIGS. 4A and 4B as follows: The production wafer 22 is placed in the wafer stage 112 of the stepper 100. The wafer stage 112, light source, lens, and mask are aligned to produce region 1 and region 1 is exposed. During alignment, location data for the wafer stage 112 is obtained using the alignment mirrors 114, 116 and interferometers 118, 120 of the stepper. The wafer stage location is processed by the processor 122 of the stepper 100, and is stored in memory 123. After exposure of region 1, the wafer stage 112 moves to region 2 and the mask is aligned and region 2 is exposed.

For the next layer, the production wafer 22 is removed from the stepper 100 and placed in the wafer stage 212 of the scanner 220. During this transfer step, the production wafer 22 is maintained in the same orientation in the x-y plane. The wafer stage 212, light source, lens and mask of the scanner are aligned in order to commence scanning of region 3 of the production wafer. In order for scanned sub-area 3 to align with sub-areas 1 and 2 previously produced, the scanner processor 222 transforms the location data obtained from the stepper 100 using the calibration array according to mathematical models known in the art, and the scanner 200 locates the wafer stage 212 according to the transformed location data using the alignment mirrors 214, 216 and interferometers 218, 220. The transformed location data used to align wafer stage 212 accommodates the imperfections of the location mirrors of the wafer stages of the stepper 100 and scanner 200. By using the transformed location data the wafer stage 212 can be correctly positioned so that the scanning process aligns with the previously exposed regions from the stepping process.

Figure 9:
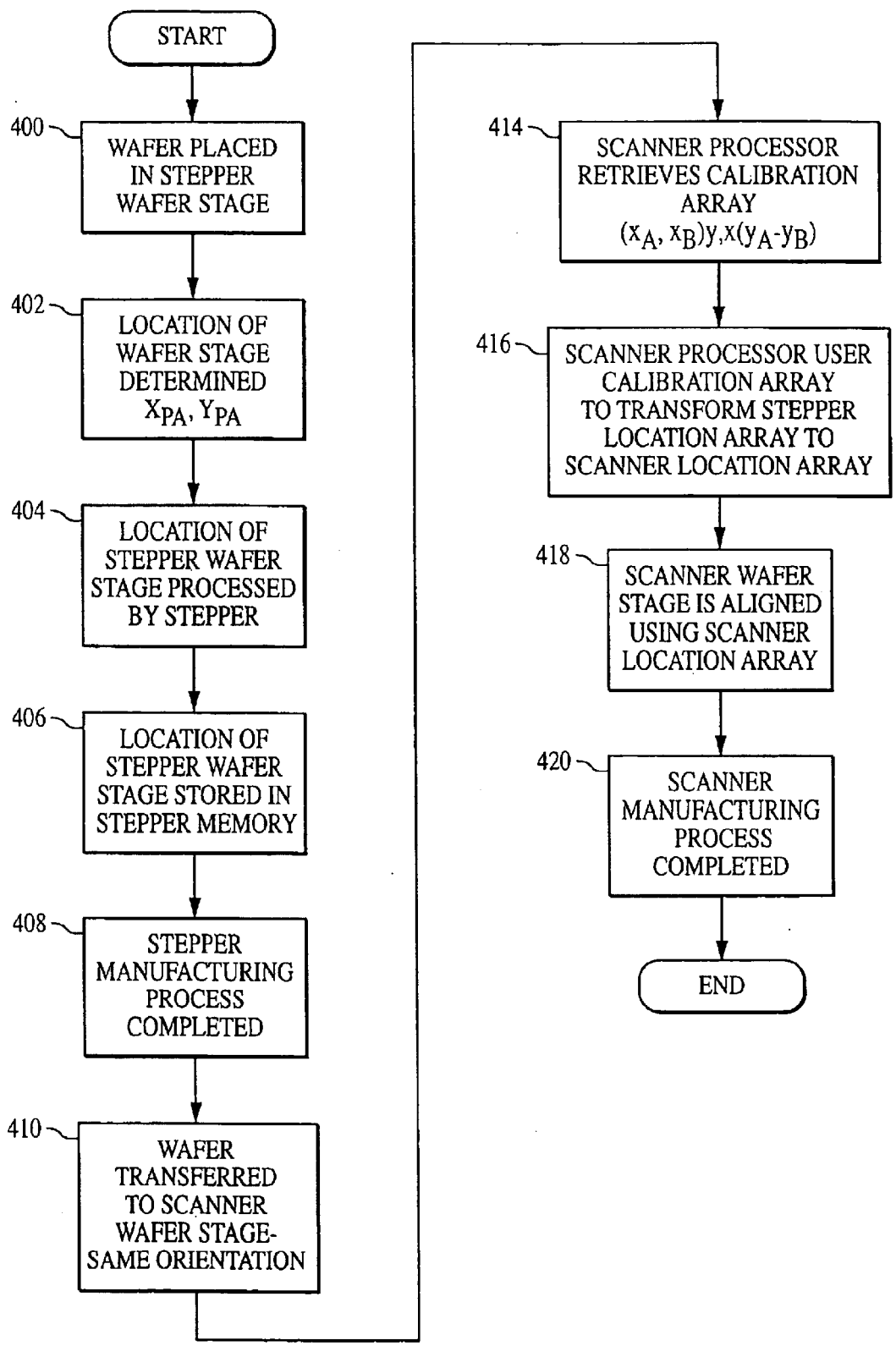
FIG. 9 is a flow chart for an integrated circuit manufacturing process including stepping and scanning.

This manufacturing process may be illustrated using the flow chart set forth in FIG. 9. A production wafer 22 is placed in the wafer stage 112 of stepper 100 at step 400. Next, the location of the wafer stage is determined using the interferometers 118, 120 and mirrors 114, 116 of the stepper 100 at step 402. This location data of the wafer stage 112 of the stepper constitutes stepper array $x_{PA}$, $y_{PA}$. The stepper location array $x_{PA}$, $y_{PA}$ is processed by the processor 122 at step 404 and transmitted to the stepper memory 123 at step 406. At step 408, the photolithographic manufacturing process of the stepper 100 is completed. At step 410, the production wafer 22 is transferred from the wafer stage 112 of the stepper 100 and placed in the wafer stage 212 of the scanner 200. During this transfer step, the production wafer 22 maintains the same orientation in the x-y plane. In FIGS. 4A and 4B this orientation is with the notch 23 facing up.

In order to align the wafer stage 212 in the scanner 200, the stepper location array $x_{PA}$, $y_{PA}$ of the wafer stage 112 of the stepper 100 is transformed by the calibration array. Specifically, the scanner processor 222 retrieves stepper location array $x_{PA}$, $y_{PA}$ from the memory 223 at step 412 and retrieves the calibration array from the memory 223 at step 414. At step 416, the calibration array $(x_A-x_B)$, y, x, $(y_A-y_B)$ is used to transform the stepper location array $x_{PA}$, $y_{PA}$ to produce a scanner location array $x_{PB}$ $y_{PB}$. The scanner location array $x_{PB}$, $y_{PB}$ is used to align the wafer stage 212 of the scanner 200 in step 420. The scanner 200 completes its photolithographic manufacturing process at step 422.

Figure 10:
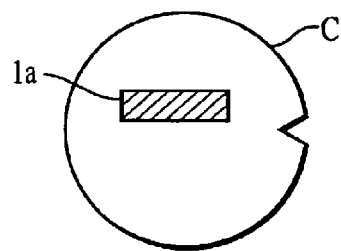
FIG. 10 is a plan view of a wafer with a first stepped area exposed according to a conventional process.
Figure 11:
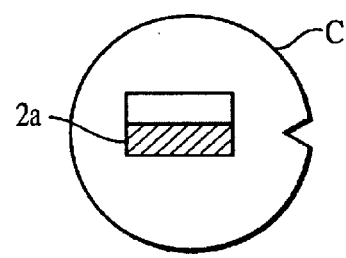
FIG. 11 is a plan view of a wafer with a second stepped area exposed according to a conventional process.
Figure 12:
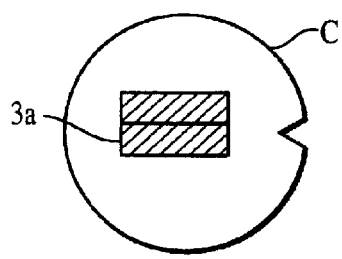
FIG. 12 is a plan view of a wafer with a single scanned area exposed according to a conventional process.
Figure 13:
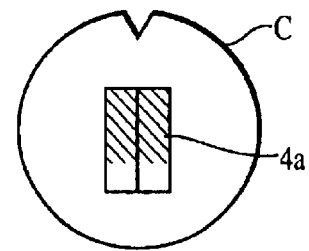
FIG. 13 is a plan view of a wafer rotated to accommodate a single scanning process according to a conventional process.
Figure 14A:
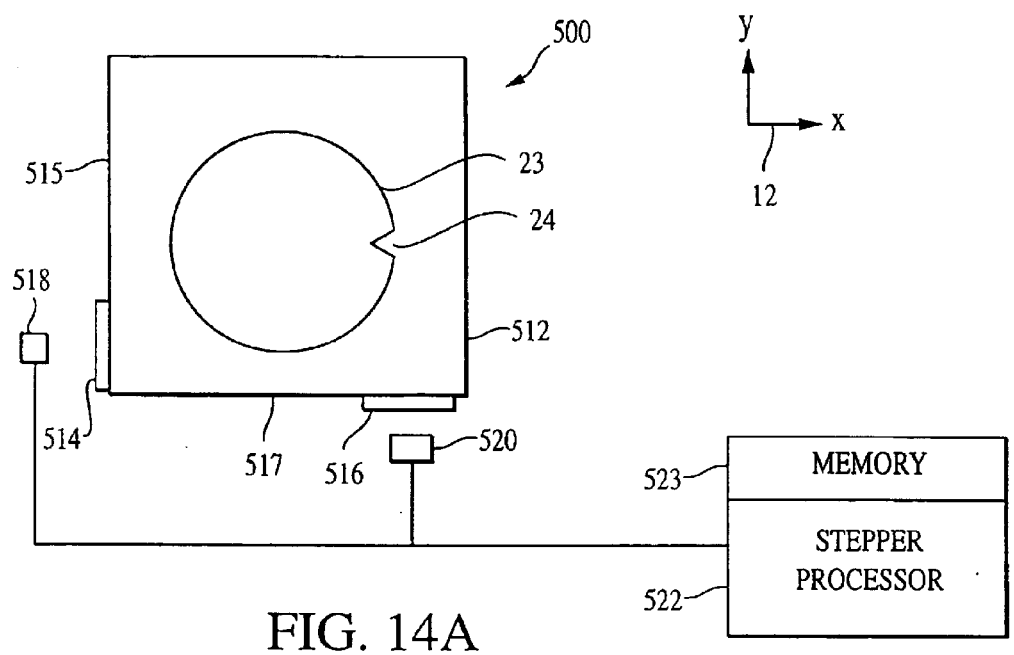
FIGS. 14A and 14B illustrate a partial schematic drawing of a stepper and scanner wherein a production wafer is rotated when transferred from the stepper to the scanner.
Figure 14B:
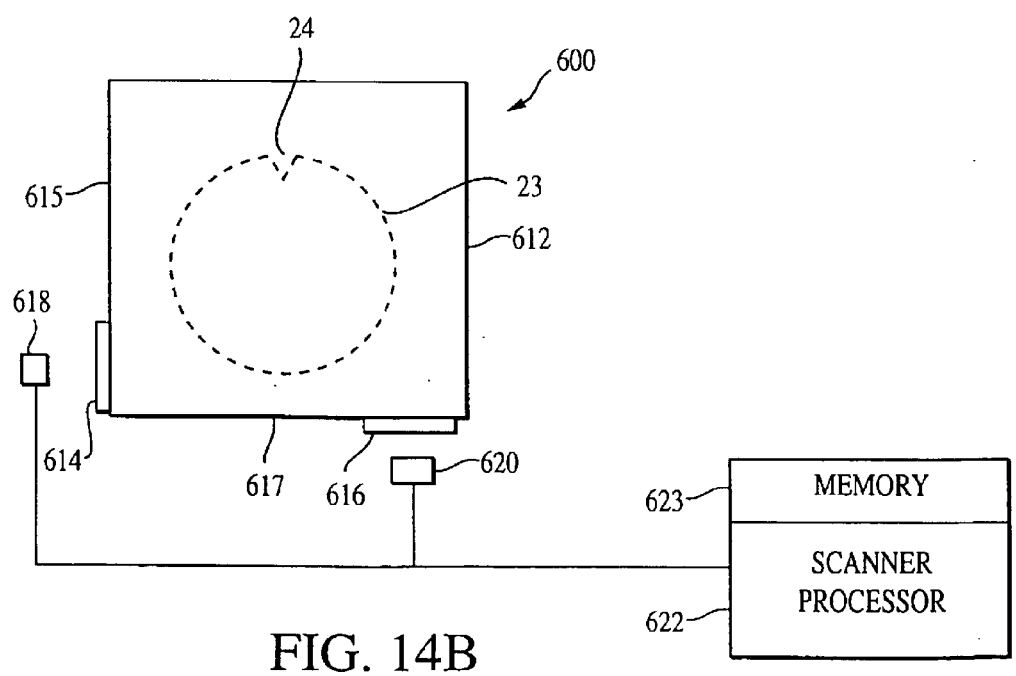

Under the improved alignment method for accommodating rotated wafers during the manufacture of an integrated circuit, an existing calibration array obtained using a calibration wafer 10 that is not rotated, is modified and used to determine and control the position of a production wafer 23 that is rotated when transferred from a stepper to a scanner. As shown in FIGS. 14A and 14B, the production wafer 23 is placed in the wafer stage 512 of the stepper 500 with its notch 24 facing in a first direction (x). The wafer stage 512, light source, lens, and mask (not shown) are aligned to produce sub-area 1 and sub area 1 is exposed as shown in FIG. 10. During alignment, location data $x_{NA}$, $y_{NA}$ for the wafer stage 512 is obtained using the alignment mirrors 514, 516 and interferometers 518, 520 of the stepper 500. This location is processed by the processor 522 of the stepper 500 at step 504 and transmitted to the stepper memory 523. After exposure of sub-area 1, the wafer stage 512 moves to sub-area 2 and the mask is aligned and sub-area 2, FIG. 11, is exposed.

For the next layer, after other processes, the production wafer 23 is placed in the wafer stage 612 of the scanner 620. During this step, the production wafer 23 is rotated 90° in the x-y plane, so that its notch 24 faces in a second direction (y), to accommodate a single scanning pass. In the illustrated embodiment, the second direction (y) is orthogonal to the first direction (x). The present invention should not be limited, however, to the preferred embodiments shown and described in detail herein. Because of the rotation of the production wafer 23, the calibration array obtained with a calibration wafer that was not rotated is modified by switching the sub-array $x_B$ for the sub-array $y_B$. Substituting $y_B$ for $x_B$ in the vertical component of the calibration array, $(x_A-y_B)$, y, accounts for the difference in profile between the x-location mirror 514 of the stepper 500 and the y-location mirror 616 of the scanner 600. Similarly, substituting $x_B$ for $y_B$ in the horizontal component of the calibration array, x, $(y_A-x_B)$, accounts for the difference in profile between the y-location mirror 516 of the stepper 500 with the x-location mirror 614 of the scanner 600. These modifications effect a switch of the vertical bar 16a with the horizontal bar 18b of the actual cruciform pattern produced in the calibration wafer 10 by the scanner 600. The complete, modified calibration array is represented by $(x_A-y_B)$, y, x, $(y_A-x_B)$.

The wafer stage 612, light source, lens and mask of the scanner 600 are aligned to commence scanning of sub-area 3 of the production wafer. In order for scanned sub-area 3 to align with sub-areas 1 and 2 previously produced, the scanner processor 622 transforms the location data $x_{NA}$, $y_{NA}$ obtained from the stepper 500 using the modified calibration array and mathematical models known in the art. Then the transformed location $x_{NB}$, $y_{NB}$ data is used by the scanner 600 to locate the wafer stage 612 according to the transformed location data $x_{NB}$, $y_{NB}$ using the alignment mirrors 614, 616 and interferometers 618, 620. The transformed location data $x_{NB}$, $y_{NB}$ correctly locates the wafer stage 612 so that the scanning step aligns with the previously exposed areas from the stepping process.

Figure 15:
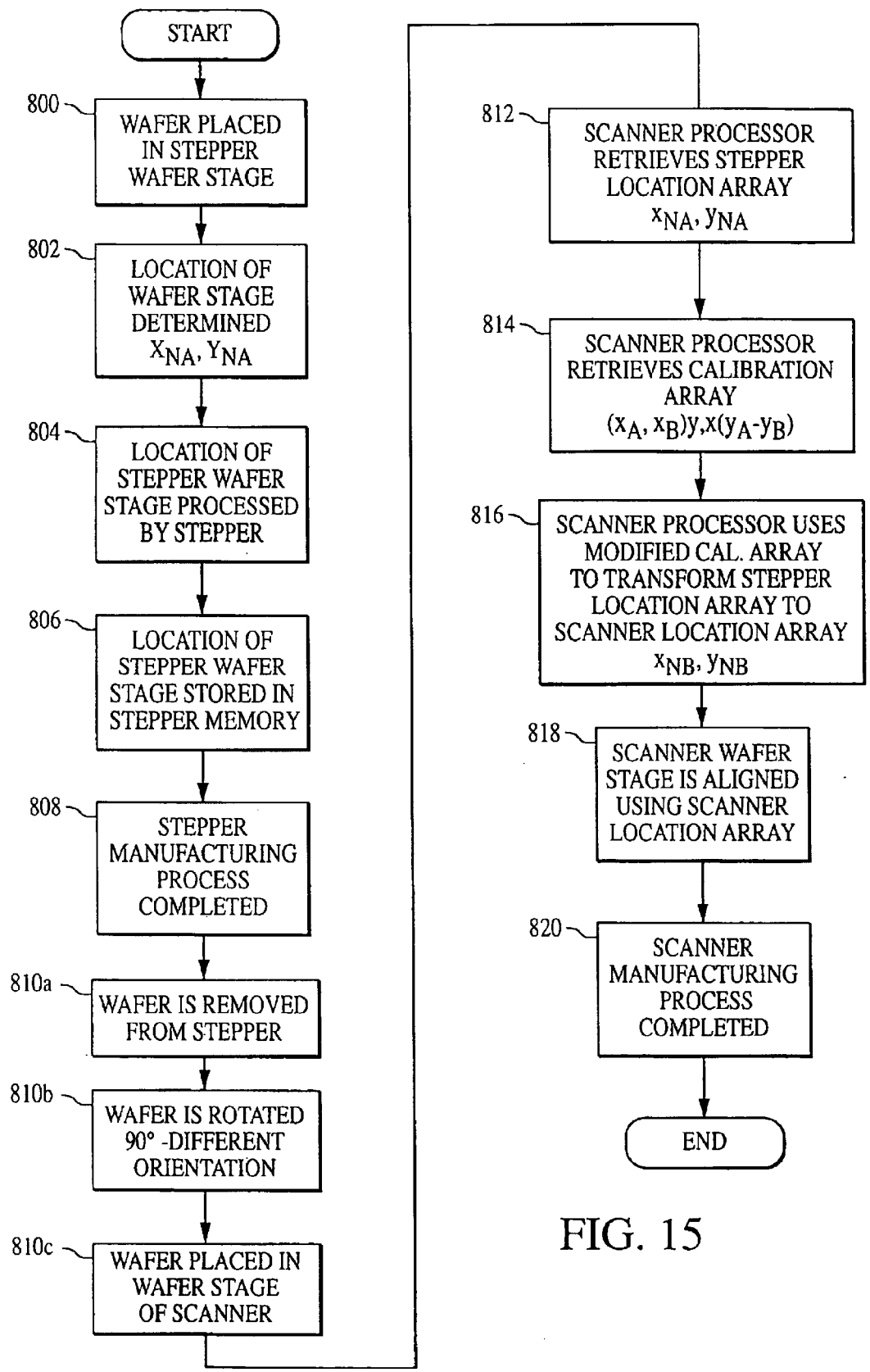
FIG. 15 is a flow chart for an integrated circuit manufacturing process wherein a wafer is rotated when transferred from a stepper to a scanner.

Referring now to FIG. 15, a production wafer 23 is placed in the wafer stage 512 of stepper 500 at step 800. Next, the location of the wafer stage is determined using the interferometers 518, 520 and mirrors 514, 516 of the stepper 500 at step 802. This location data of the wafer stage 512 of the stepper 500 constitutes an array $x_{NA}$, $y_{NA}$. The stepper location array data $x_{NA}$, $y_{NA}$ is processed by the processor 522 of the stepper 500 at step 804 and is stored in memory 523 at step 806. At step 808, the photolithographic manufacturing process of the stepper 500 is completed. At step 810a, the production wafer 23 is removed from the wafer stage 512 of the stepper 500, rotated 900 at step 810b and placed in the wafer stage 612 of the scanner 600 at step 810c. In FIGS. 14A and 14B, the orientation of the production wafer 23 changes from the notch facing in the first direction (x) in the stepper 500 to facing in the second direction (y) in the scanner 600.

To align the wafer stage 612 in the scanner 600, the location data $x_{NA}$, $y_{NA}$ of the wafer stage 512 of the stepper 500 is transformed by the modified calibration array. Specifically, the scanner processor 622 retrieves the stepper location array data $x_{NA}$, $y_{NA}$ from the memory 623 at step 812 and retrieves the modified calibration array from the memory 623 at step 814. At step 816, the modified calibration array $(x_A-y_B)$, y, x, $(y_A-x_B)$ is used to transform the stepper location array $x_{NA}$, $y_{NA}$ to produce a scanner location sub-array $x_{NB}$, $y_{NB}$. The scanner location array data $x_{NB}$, $y_{NB}$ is used to align the wafer stage 612 of the scanner 600 in step 820. The scanner 600 completes its photolithographic manufacturing process at step 822.

The invention provides a method of transforming calibration data to accommodate the rotation of production wafers in successive stepping and scanning stages in the manufacture of integrated circuits. Variations of the disclosed embodiment will be readily apparent to those skilled in the art. For instance, different stepping and scanning processes could be used to practice the invention and different mathematical nomenclature could be used. In addition the various processors and memory devices could be distributed differently than the components of the manufacturing center described. Accordingly, it is to be understood that although the present invention has been described with reference to exemplary embodiments, various modifications may be made without departing from the spirit or scope of the invention which is defined solely by the claims appended hereto.

What is claimed as new and desired to be protected by Letters Patent of the United States is:

1. A wafer production system comprising:
a first machine for processing wafers in a first orientation;
a second machine for processing wafers in a second orientation;
a system arranged to acquire calibration data representative of a difference in alignment between a first pattern formed on a calibration wafer in the first machine and a second pattern formed on the calibration wafer in the second machine; and
a processor arranged to mathematically transform the calibration data to account during wafer alignment for a change in processing orientation of a production wafer transferred between the first machine and the second machine.

2. A wafer production system as recited in claim 1, wherein the system arranged to acquire calibration data includes a pattern forming arrangement in each of the first and second machines developed to form patterns on the calibration wafer.

3. A wafer production system as recited in claim 2, wherein the arrangement in each of the first and second machines is developed to form printed patterns on an upper surface of the calibration wafer.

4. A wafer production system as recited in claim 2, wherein the processor determines differences between first coordinates of the first pattern formed on the calibration wafer in the first orientation and second coordinates of the second pattern formed on the calibration wafer in the first orientation.

5. A wafer production system as recited in claim 1, wherein the system arranged to acquire calibration data includes metrology in each of the first and second machines equipped to determine locations of points of the first and second patterns formed on the calibration wafer.

6. A wafer production system as recited in claim 1, wherein the first machine is a stepper and the second machine is a scanner.

7. A wafer production system as recited in claim 6, wherein the stepper and the scanner are not equipped to execute stepping and scanning in respectively different directions.

8. A wafer production system as recited in claim 1, further comprising an adjustor equipped to adjust the alignment of a production wafer based on the calibration data.

9. A wafer processing apparatus comprising:
a first machine and a second machine for processing production wafers in respective first and second orientations;
a first device arranged to form a first pattern on a calibration wafer in the first orientation in the first machine;
a second device arranged to form a second pattern on the calibration wafer in the first orientation in the second machine; and
a wafer alignment adjusting arrangement controlled to adjust an alignment of a production wafer processed in the second orientation in the second machine based on differences between the first pattern and the second pattern.

10. A wafer processing apparatus as recited in claim 9, further comprising a processor arranged to generate a calibration array based on the differences between the first pattern and the second pattern.

11. A wafer processing apparatus as recited in claim 10, wherein the processor is arranged to mathematically transform the calibration array to account during wafer alignment for a rotation of the production wafer for processing in the second machine in the second orientation subsequent to processing in the first machine in the first orientation.

12. A wafer processing apparatus as recited in claim 9, wherein the first orientation and the second orientation are mutually orthogonal.

13. A wafer processing apparatus as recited in claim 9, wherein the patterns are formed on an upper surface of the calibration wafer.

14. A wafer processing apparatus as recited in claim 9, wherein the patterns are formed by printing.

15. A wafer processing apparatus as recited in claim 14, wherein the patterns are cruciform.

16. A wafer processing apparatus as recited in claim 9, wherein the first machine is a stepper, and the second machine is a scanner.

17. A wafer processing apparatus as recited in claim 16, wherein the stepper and the scanner are not equipped to execute stepping and scanning in respectively different directions.

18. A wafer processing system comprising:
   a first device controlled to form a first calibration pattern on a calibration wafer in a first orientation, and to process a production wafer in the first orientation; and
   a second device controlled to form a second calibration pattern on the calibration wafer in the first orientation, and to process the production wafer in a second orientation different from the first orientation and aligned based on differences between the first calibration pattern and the second calibration pattern.

19. A wafer processing system as recited in claim 18, further comprising a processor arranged to determine the differences between the first calibration pattern and the second calibration pattern.

20. A wafer processing system as recited in claim 19, wherein the processor is arranged to transform a calibration array based on the differences between the first calibration pattern and the second calibration pattern to produce a transformed array.

21. A wafer processing system as recited in claim 20, further comprising an arrangement to align the production wafer in the second device based on the transformed array.

22. A wafer processing system as recited in claim 18, wherein the first device is a stepper and the second device is a scanner.

* * * * *